UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

VAT DYE DERIVED FROM INDIRUBIN AND PROCESS OF MAKING SAME.

No. 876,158.     Specification of Letters Patent.     Patented Jan. 7, 1908.

Application filed March 27, 1907. Serial No. 364,910.

*To all whom it may concern:*

Be it known that I, GADIENT ENGI, doctor of philosophy and chemist, a citizen of the Swiss Republic, and resident of Basel, Switzerland, have invented new and useful Vat Dyestuffs Derived from Indirubin and a Process for the Manufacture of the Same, of which the following is a full, clear, and exact specification.

It is known that the condensation product called indirubin derived from indoxyl and isatin and having the constitution

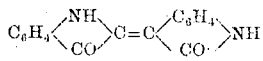

yields by treatment with reducing agents a vat wherein cotton, owing to its comparatively small affinity for the dyestuff, is dyed valueless lilac tints very little fast to washing.

For the same reasons the monobromoindirubin

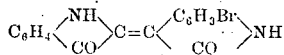

described by Ad. Baeyer (vide *Berichte der Deutschen Chemischen Gesellschaft* Vol. XIV, page 1745) and obtained by condensing monobromoisatin with indoxyl has no tinctorial interest. On the contrary I have found that by introducing more than one molecular proportion of a halogen into the molecule of indirubin, new valuable vat-dyestuffs are obtained, which, as compared with indirubin, have the great advantage that they dye valuable violet to heliotrope tints of great intensity and vividness, these tints being satisfactorily fast owing to the increased affinity of the dyestuffs for the fiber. The most valuable of the halogens in this respect is bromin; it may be introduced into the indirubin by treating the latter with bromin or substances yielding bromin, best in presence of an indifferent solvent or diluent, preferably nitrobenzene.

The invention is illustrated by the following examples, the parts being by weight.

Example I: 3 parts of indirubin, 30 parts of nitrobenzene and 3.6 parts (about 4 atomic proportions) of bromin are well mixed together and allowed to remain at ordinary temperature for 24 hours; after the lapse of this time, the mixture is heated, if necessary for 3–4 hours, in a reflux apparatus in an oil bath the temperature of which is 130–140° C. After it has cooled, the mass is filtered, and the solid matter washed with alcohol and dried, whereby the brominated product corresponding probably to a dibromoderivative of indirubin is obtained in good yield in the form of a violet crystalline powder. In concentrated sulfuric acid the product is soluble, especially on warming, to a greenish blue solution, from which on addition of water red violet flocks are precipitated. Fuming sulfuric acid dissolves the brominated product with formation of a sulfonic acid, the solution being brilliant violet, changing to red violet when the solution is poured into water: in this aqueous solution wool is dyed vivid lilac tints. In anilin and in nitrobenzene, the new dyestuff dissolves somewhat easily even when cold; in the hot solvents the solution is violet red. In cold benzene the dyestuff is hardly soluble, but in hot benzene it dissolves somewhat easily to a red violet solution; in alcohol, even when hot, it is only difficultly soluble to a red violet solution. By treatment with alkaline reducing agents, the dyestuff yields a bright yellow vat, wherein cotton without a mordant is dyed intense violet tints satisfactorily fast to washing and to chlorin.

Example II: A more highly brominated product may be obtained as follows: 3 parts of indirubin, 30 parts of nitrobenzene and 5.5–7.5 parts of bromin (6 to 8 atomic proportions) are mixed together and allowed to remain for 24 hours, after which time the mixture is heated for about 3–4 hours in a reflux apparatus in an oil bath at 130–140° C., much hydrogen bromid being evolved. The cooled mixture is filtered and the solid matter is washed with alcohol and dried. The new bromin derivative of indirubin is thus obtained in satisfactory yield as a brownish-violet crystalline powder; it dissolves in concentrated sulfuric acid, especially when heated, to a green solution from which water precipitates the dyestuff in the form of bordeaux red flocks. Fuming sulfuric acid dissolves the dyestuff to a lilac solution, and on addition of water and heating a beautiful violet solution is obtained, the sulfonated dyestuff in which dyes wool vivid lilac tints. In alcohol and benzene, even when hot, the new dyestuff is as good as insoluble. Anilin hardly dissolves it when cold; when hot it dissolves the dyestuff easily to a red violet solution. Cold nitrobenzene dissolves the dyestuff only very sparingly, but the hot solvent dissolves it easily to a brilliant violet red solution. When treated with alkaline reducing agents, the dyestuff yields a bright yellow vat, wherein cotton is dyed violet tints which pass to a very vivid, advantageously fast heliotrope, when subjected to a short soaping at 90° C.

What I claim is:

1. The herein described process for the manufacture of vat dyestuffs, which consists in treating with a halogen the condensation product called indirubin and derived from indoxyl and isatin.

2. As new products, the polyhalogenated vat-dyestuffs obtained by treating indirubin with more than two atomic proportions of a halogen, constituting in dry state violet crystalline powders, dissolving in concentrated sulfuric acid with a greenish blue to green coloration, soluble in hot anilin and nitrobenzene with a violet coloration and yielding, when treated with alkaline reducing agents, a bright yellow vat dyeing cotton violet tints fast to washing and chlorin.

In witness whereof I have hereunto signed my name this 11th day of March 1907, in the presence of two subscribing witnesses.

GADIENT ENGI.

Witnesses:
GEO. GIFFORD,
AMAUD BRAUN.